(12) United States Patent
Park (10) Patent No.: US 11,863,833 B2
(45) Date of Patent: Jan. 2, 2024

(54) STREAMING BROADCAST SPONSORSHIP SYSTEM USING INTERNET OF THINGS DEVICE

(71) Applicant: Jung Hun Park, Seoul (KR)

(72) Inventor: Jung Hun Park, Seoul (KR)

( * ) Notice: Subject to any disclaimer, the term of this patent is extended or adjusted under 35 U.S.C. 154(b) by 0 days.

(21) Appl. No.: 18/001,452

(22) PCT Filed: Jun. 8, 2021

(86) PCT No.: PCT/KR2021/007108
§ 371 (c)(1),
(2) Date: Dec. 9, 2022

(87) PCT Pub. No.: WO2021/251713
PCT Pub. Date: Dec. 16, 2021

(65) Prior Publication Data
US 2023/0239540 A1   Jul. 27, 2023

(30) Foreign Application Priority Data

Jun. 11, 2020  (KR) .......................... 10-2020-0070906

(51) Int. Cl.
*H04N 21/4784* (2011.01)
*G06Q 30/0208* (2023.01)
(Continued)

(52) U.S. Cl.
CPC ..... *H04N 21/4784* (2013.01); *G06Q 30/0208* (2013.01); *H04N 21/2407* (2013.01); *H04N 21/4316* (2013.01)

(58) Field of Classification Search
CPC ........... H04N 21/4784; H04N 21/2407; H04N 21/4316; G06Q 30/0208
See application file for complete search history.

(56) References Cited

U.S. PATENT DOCUMENTS

2019/0297385 A1\* 9/2019 Park ................. H04N 21/25866
2019/0304264 A1\* 10/2019 Gauld ....................... G08B 5/36
(Continued)

FOREIGN PATENT DOCUMENTS

KR   10-2013-0012222 A   2/2013
KR   10-2018-0023548 A   3/2018
(Continued)

OTHER PUBLICATIONS

International Search Report for PCT/KR2021/007108 by Korean Intellectual Property Office dated Oct. 8, 2021.

*Primary Examiner* — Mulugeta Mengesha
(74) *Attorney, Agent, or Firm* — BROADVIEW IP LAW, PC (57) ABSTRACT

A streaming broadcast sponsorship system using an Internet of Things device, capable of inducing a viewer's sponsorship by enabling control of a broadcaster-owned Internet of Things device when the viewer's sponsorship is available is provided, the streaming broadcast sponsorship system includes a broadcaster terminal configured to generate a content and perform a streaming broadcast, a viewer terminal configured to be capable of viewing the broadcast, a server configured to receive the content from the broadcaster terminal, and transmit the received content to the viewer terminal, and IoT devices configured to be capable of communicating with the server and operated by the server, in which the viewer terminal generates sponsorship information for the broadcaster and transmit the sponsorship information to the server, and the server transmits a control signal corresponding to the sponsorship information to the IoT devices, and the IoT devices are operated by the control signal.

4 Claims, 3 Drawing Sheets

(51) Int. Cl.
*H04N 21/24* (2011.01)
*H04N 21/431* (2011.01)

(56) References Cited

U.S. PATENT DOCUMENTS

2020/0169782 A1* 5/2020 Ribeiro de Oliveira ................... H04N 21/242
2021/0334836 A1* 10/2021 Singh ..................... G06N 20/00

FOREIGN PATENT DOCUMENTS

| KR | 10-2018-0048766 A | 5/2018 |
| KR | 10-2004221 B1 | 7/2019 |
| KR | 10-2019-0110194 A | 9/2019 |
| KR | 10-2086905 B1 | 3/2020 |

* cited by examiner

STREAMING BROADCAST SPONSORSHIP SYSTEM USING INTERNET OF THINGS DEVICE

CROSS-REFERENCE TO RELATED APPLICATIONS

This application is a National Phase Entry Application of PCT Application No. PCT/KR2021/007108 filed on Jun. 8, 2021, which claims priority to Korean Patent Application No. 10-2020-0070906 filed on Jun. 11, 2020, in Korean Intellectual Property Office, the entire contents of which are hereby incorporated by reference in its entirety.

TECHNICAL FIELD

The present invention relates to a streaming broadcast sponsorship system using an Internet of Things device, and more particularly, to a streaming broadcast sponsorship system using an Internet of Things device capable of inducing a viewer's sponsorship by enabling control of a broadcaster-owned Internet of Things device when there is the viewer's sponsorship.

BACKGROUND ART

Recently, there has been actively increasing broadcast productions of a live streaming service by broadcast producers (hereinafter referred to as 'broadcaster') that provide broadcasts in real time in various fields through a PC or smartphone connected to a camera. For example, broadcasters provide personal broadcasts in real time using domestic and international platforms such as YouTube, Afreeca, or Twitch.

A viewer may access the platforms and support the broadcaster by watching the broadcasts, participating in a chat, or sponsoring the broadcaster (e.g., star balloons or donations, etc.). For example, the viewer may purchase sponsorship items (or cyber money, etc.) which amount to real money through a live broadcast platform (or a live sponsorship platform), and sponsor the broadcaster using the purchased sponsorship items. The sponsorship items supporting the broadcaster may be settled with real money. The sponsored broadcaster may pay a fee to the platform and get paid with real money which amount to the remaining sponsorship item.

As described above, the sponsorship item provides both the company providing the platform and the live broadcaster with financial benefits.

The company providing the platform implements a function to provide a reward to the viewer who uses the sponsorship item on the platform. For example, the reward implemented on the platform is to play a photo file, a music file, or a video file sent by a sponsor, or to display a chat message sent by the sponsor in a different manner from those of others.

The broadcaster provides the sponsor with an appropriate response or reaction (hereinafter referred to as a "reaction") corresponding to the sponsorship item or donation. For example, the broadcaster provides a reaction such as giving feedback on a music file or video file sent by the sponsor, or reading a chat sent by the sponsor at the same time as sponsoring.

However, the conventional reward to the sponsorship described above is limited to chats, simple images, sounds, or videos. Therefore, there is an increasing need for more interesting reward.

Documents of related art related to the present invention include Korean Patent No. 10-2086905 and the like.

DISCLOSURE

Technical Problem

The object of the present invention for solving these problems is to provide a streaming broadcast sponsorship system using an Internet of Things device capable of inducing a viewer's sponsorship by enabling control of a broadcaster-owned Internet of Things device when there is the viewer's sponsorship.

Technical Solution

To achieve the above-described object, the present invention provides a streaming broadcast sponsorship system using an Internet of Things device, the streaming broadcast sponsorship system including: a broadcaster terminal configured to generate a content and perform a streaming broadcast; a viewer terminal configured to be capable of viewing the broadcast; a server configured to receive the content from the broadcaster terminal and transmit the received content to the viewer terminal; and IoT devices configured to be capable of communicating with the server and operated by the server, in which the viewer terminal generates sponsorship information for the broadcaster and transmit the sponsorship information to the server, and the server transmits a control signal corresponding to the sponsorship information to the IoT devices, and the IoT devices are operated by the control signal.

The IoT devices are pre-registered in the server and only for a device which agrees to an operation authority setting before broadcasting is operated by the control signal.

The sponsorship information includes at least one of a donation, an operation target device, and operation information of the operation target device.

The IoT devices include a broadcaster IoT device installed and operated at a location adjacent to the broadcaster terminal and a viewer IoT device installed and operated at a location adjacent to the viewer terminal.

The server further includes an IoT matching unit configured to match the broadcaster terminal and the viewer terminal having the same IoT device.

Advantageous Effects

According to the streaming broadcast sponsorship system using an Internet of Things device according to the present invention, when there is a viewer's sponsorship, the viewer may control the Internet of Things device owned by the broadcaster, thereby making it possible to induce the viewer's sponsorship and at the same time provide a more interesting reward for the sponsorship.

In addition, according to the streaming broadcast sponsorship system using an Internet of Things device according to the present invention, when there is a viewer's sponsorship, the viewer may control not only the Internet of Things device owned by the broadcaster but also Internet of Things devices owned by other viewers, thereby making it possible to induce the viewer's sponsorship and also provide a more interesting reward for the sponsorship.

BEST MODE

Hereinafter, some embodiments of the present invention will be described in detail with reference to the illustrative drawings. In assigning reference numerals to constituent elements of the respective drawings, it should be noted that the same constituent elements will be designated by the same reference numerals, if possible, even though the constituent elements are illustrated in different drawings.

Further, in the following description of the embodiments of the present invention, a detailed description of related publicly-known configurations or functions will be omitted when it is determined that the detailed description obscures the understanding of the embodiments of the present invention.

In addition, the terms first, second, A, B, (a), and (b) may be used to describe constituent elements of the embodiments of the present invention. These terms are used only for the purpose of discriminating one constituent element from another constituent element, and the nature, the sequences, or the orders of the constituent elements are not limited by the terms.

In the present specification, a live broadcast producer may mean a broadcaster appearing in a taken video, for example, a play director (PD), a creator, a streamer, a master of ceremonies (MC), a broadcasting jockey (BJ), or a broadcaster.

In the present specification, a content may mean various information or contents thereof provided through the Internet or computer communication, and refers to various information or contents thereof that are digitally produced, processed and distributed a text, code, voice, sound, image, and video, etc. for use in wired and wireless telecommunication networks. In the present specification, it is preferable that the content may mean a video taken and produced for a live broadcast by a broadcaster or data including the video.

Hereinafter, the present invention will be described in more detail with reference to the accompanying drawings.

Figure 1:
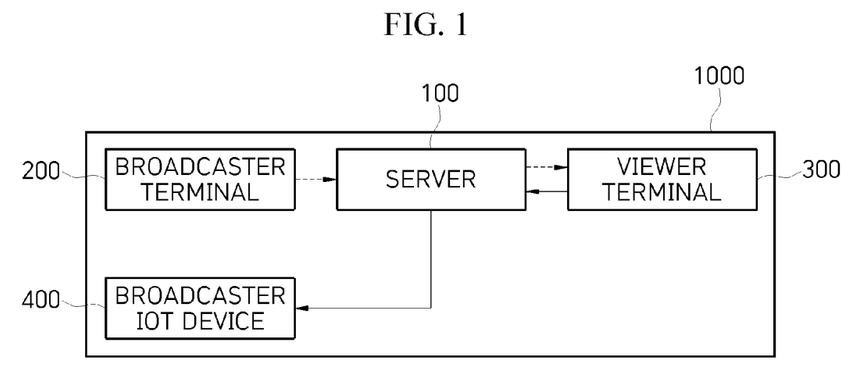
FIG. 1 is a block diagram briefly illustrating a streaming broadcast sponsorship system using an Internet of Things device according to the present invention.
Figure 2:
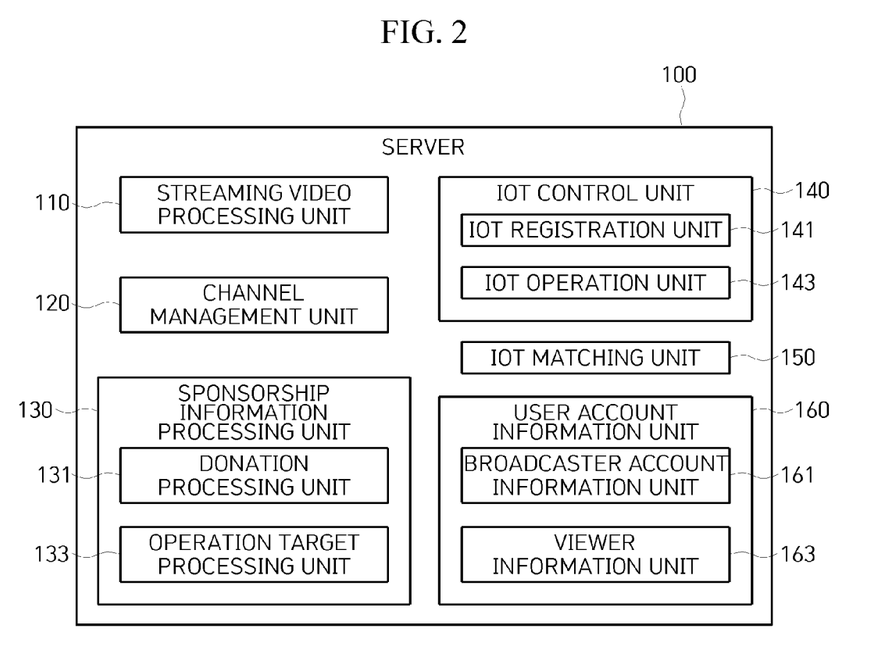
FIG. 2 is a block diagram briefly illustrating a configuration of a server according to the present invention.

FIG. 1 is a block diagram briefly illustrating a streaming broadcast sponsorship system 1000 using an Internet of Things device according to the present invention and FIG. 2 is a block diagram briefly illustrating a configuration of a server 100 according to the present invention.

Referring to FIG. 1, the streaming broadcast sponsorship system 1000 using an Internet of Things device according to the present invention includes a broadcaster terminal 200 configured to generate a content and perform a streaming broadcast; a viewer terminal 300 configured to be capable of viewing the broadcast; the server 100 configured to receive the content from the broadcaster terminal 200, and transmit the received content to the viewer terminal 300; and IoT devices 400 and 500 configured to be capable of communicating with the server 100 and operated by the server 100.

The broadcaster terminal 200 according to the present invention produces and generates in real time a content for a live broadcast However, the present invention is not limited thereto, and the broadcaster terminal 200 may receive the pre-generated content from the outside. The broadcaster terminal 200 transmits the content produced and generated by the broadcaster to the server 100. The broadcaster terminal 200 may include a camera module configured to take the broadcaster for producing and generating the content, but is not limited thereto and may be electrically connected to a separate camera module. The broadcaster terminal 200 transmits the produced and generated content to the server 100 so that a streaming broadcast may be performed.

The server 100 according to the present invention receives the content transmitted from the broadcaster terminal 200. The server 100 may be connected to a plurality of broadcaster terminals 200 and may have a plurality of channels connected to each broadcaster terminal 200. Each channel is accessed by the viewer terminal 300 to view the content transmitted by the broadcaster terminal 200. The viewer terminal 300 may access a specific channel of the server 100 and view the content transmitted by the broadcaster terminal 200 connected to the specific channel. The server 100 receives the specific content from the broadcaster terminal 200 and transmits the received content to the viewer terminal 300 accessing the corresponding channel. The server 100 enables viewing the content transmitted in real time from the broadcaster terminal 200 connected to the specific channel accessed by the viewer terminal 300.

Referring to FIG. 2, the server 100 according to the present invention includes a streaming video processing unit 110 that receives the content transmitted from the broadcaster terminal 200 and processes the content so that the viewer terminal 300 may stream the content in real time. The streaming video processing unit 110 processes the content received from the broadcaster terminal 200. The streaming video processing unit 110 may synthesize various effects or stickers which are set by the broadcaster terminal 200 with a video, and may synthesize chats, etc. transmitted from the viewer terminal 300 with the video. The content synthesized by the streaming video processing unit 110 may be transmitted to a plurality of viewer terminals 300 accessing the same channel in the server 100.

The server 100 according to the present invention may further include a channel management unit 120 to manage a specific broadcaster terminal 200 and a channel to which viewer terminals access for viewing the content transmitted by the corresponding specific broadcaster terminal 200. The channel management unit 120 may limit the number of accessible viewer terminals 300 according to the rating of the specific broadcaster terminal 200. For example, the rating of the broadcaster terminal 200 may be differentially determined according to the donation of the current month or the guest month of the specific broadcaster terminal 200 connected to the corresponding channel. The viewer terminals 300 that are capable of accessing the corresponding channel may be limited in number depending on the rating of the broadcaster terminal 200, thereby making it possible to enable a smooth streaming service. The rating of the broadcaster terminal 200 may be calculated based on a total cumulative donation or a period of time during which a streaming service is performed by accessing the server 100 according to the present invention, or the corresponding rating may be determined by combining all the methods described above. In addition, the rating of the broadcaster terminal 200 may be determined based on the publicly-known method.

Referring back to FIG. 1, the viewer terminal 300 according to the present invention accesses the server 100 (preferably accessing a specific channel) and views the content transmitted by the specific broadcaster terminal 200. The viewer terminal 300 may perform the sponsorship at the server 100 for a holder of the corresponding broadcaster terminal 200, that is, the broadcaster. As described above, in the related art, the viewer terminal 300 transmits specific chats, sound sources, or videos together with the sponsorship to view the broadcaster's response, that is, the reaction and enjoy the corresponding content. Most broadcasters want to communicate with the viewer by giving feedback on chats, sound sources, or videos sent by the sponsor, and expressing a thanks to the sponsor. The viewer sponsors the broadcaster by paying money for the pleasure of interacting with the broadcaster.

The streaming broadcast sponsorship system 1000 using an Internet of Things device according to the present invention further includes the IoT devices 400 and 500 which is capable of communicating with the server 100 according to the present invention. In the present specification, the IoT devices 400 and 500 may mean devices to which the Internet of Things is applied. An Internet of Things means that a plurality of things are interconnected based on the Internet. The interconnected things based on the Internet may mutually exchange information. As the IoT devices 400 and 500 according to the present invention, all the publicly-known IoT devices 400 and 500 may be applied.

Examples of the IoT devices 400 and 500 according to the present invention may include a fan, an air conditioner, a boiler, a light, a humidifier, a dehumidifier, an air purifier, a robot vacuum cleaner, a smartphone, a PC, a speaker, a monitor, a camera, an outlet, a multi-function power strip, a scaler, various exercise equipment such as a treadmill or a cycling machine, a printer, a fax machine, a multifunction device, various power switch modules, a power adapter, a door lock, a video phone, a TV receiving device (set-top box), a vehicle, a black box, a navigation or an infrared detector, and the like to which the Internet of Things is applied.

Recently, a device called a money gun (or a cash gun) has become popular. Bills are put inside the money gun, and when a trigger is pulled, the bills thereinside are discharged to the outside. An IoT money gun equipped with the Internet of Things available power switch module instead of the trigger may be used. The bills inside the IoT money gun may be discharged by operating the power switch module coupled with the IoT money gun depending on the sponsorship of the sponsor. When the IoT money gun is used, the broadcaster may feel like being sponsored with real money instead of being sponsored with the sponsorship item on cyberspace.

The viewer terminal 300 according to the present invention may generate sponsorship information for the broadcaster and transmit the sponsorship information to the server 100. The sponsorship information generated by the viewer terminal 300 may include a donation (or a quantity of sponsorship item equivalent to the donation), an operation target device and/or operation information of the operation target device.

The operating target device which the sponsorship information includes means the IoT devices 400 and 500 that the sponsor desires to operate. The operation information of the operating target device which the sponsorship information includes may be additional operation information of the IoT devices 400 and 500 that the sponsor desires to operate. For example, the sponsor may sponsor 10,000 Korean won (or an equivalent sponsorship item) and simultaneously select a fan as the operation target device, and select a step one and rotation as the operation information of the operation target device.

Referring back to FIG. 2, the server 100 according to the present invention further includes a sponsorship information processing unit 130 that processes the sponsorship information of the sponsor. The sponsorship information processing unit 130 according to the present invention may include a donation processing unit 131 in which the donation desired to be sponsored is processed, and an operation target processing unit 133 which processes the operation target device and/or the operation information of the operation target device that the sponsor desires to operate as a reward for the sponsorship.

The donation processing unit 131 according to the present invention may obtain a viewer information through a viewer account information unit 163, which will be described later, and process a cumulative donation of the corresponding viewer. The donation processing unit 131 may deduct the donation or the sponsorship item equivalent thereto from the sponsor and transmit the donation or sponsorship item equivalent to the deducted amount to the corresponding broadcaster terminal 200.

The operation target processing unit 133 according to the present invention receives the operation target device and/or the operation information of the operation target device included in the sponsorship information and transmits the operation target device and/or the operation information of the operation target device to an IoT control unit 140, which will be described later.

The server 100 according to the present invention may further include the IoT control unit 140 that registers and controls the IoT devices 400 and 500. The IoT control unit 140 according to the present invention may include an IoT registration unit 141 in which information of the pre-registered IoT devices 400 and 500 is stored before broadcasting, and an IoT operation unit 143 that generates a control signal for operating the operation target device included in the sponsorship information and transmits the control signal to the IoT devices 400 and 500.

The information of the IoT devices 400 and 500 is pre-registered in the IoT registration unit 141 according to the present invention before broadcasting. The IoT registration unit 141 stores the information of the IoT devices 400 and 500 that is held by the broadcaster among the various IoT devices 400 and 500 described above and agrees to transfer a control authority to the sponsor. The information of the IoT devices 400 and 500 may include information such as a type, operation mechanism, serial number, password, holder name, or ID of the IoT devices 400 and 500.

The IoT operation unit 143 according to the present invention generates the control signal for operating the IoT devices 400 and 500. The control signal may be information corresponding to the sponsorship information which is generated by the viewer terminal 300 and transmitted to the server 100. An operating range of the IoT devices 400 and 500 may be differentiated according to a predetermined range of the donation included in the sponsorship information. The predetermined range of the donation and the operating range of the IoT devices 400 and 500 may be preset before broadcasting. According to the embodiment of the present invention, the predetermined range of the donation may be set to be 1,000 Korean won or more and less than 5,000 Korean won, 5,000 Korean won or more and less than 10,000 Korean won, 10,000 Korean won or more and less than 50,000 Korean won or the like and when the corresponding amount is of a high rating, the number of operation settings of the IoT devices 400 and 500 may be increased, or the operation time thereof may be increased.

For example, among pieces of information included in the sponsorship information, the operation target device may be an air conditioner, and the operation information of the operation target device may be a power-on, a power-off, or a set temperature change of the air conditioner. When it is currently the season to turn on the air conditioner during a streaming broadcast and the air conditioner included in the indoor space where the broadcaster broadcasts is running, the viewer may turn off the power of the air conditioner with the sponsorship. An operation control time of the air conditioner is determined depending on the donation of the viewer, and after a predetermined operation control time such as ten minutes has elapsed, for example, the air conditioner may be controlled to be back to the original operation (power ON). The viewer may control the broadcaster's air conditioner according to his/her sponsorship, which makes the viewer feel a kind of sense of accomplishment or fun, and the broadcaster's reaction may also be a more actual reaction than a conventional chat message reading and a reaction for a sound source or video. In addition, the broadcaster and platform operator may obtain revenue according to the greater sponsorship than before.

The IoT devices 400 and 500 according to the present invention are pre-registered to the server 100 before broadcasting, as described above. In addition, the IoT devices 400, 500 need to agree to transfer an operation authority to the sponsor before broadcasting. Among the IoT devices 400 and 500, only for the device that agree to the operation authority setting to transfer the control authority to the sponsor before broadcasting may be operated by the control signal transmitted by the server 100. That is, the server 100 transmits the control signal corresponding to the sponsorship information to the IoT devices 400 and 500, and the IoT devices 400 and 500 that receive the control signal may be operated by the control signal.

The broadcaster may determine the IoT devices 400 and 500 which may be operated by the sponsor in a broadcast that will begin soon, and may determine IoT devices 400 and 500 whose control authority may be transferred to the sponsor among the IoT devices 400 and 500 held by the broadcaster. The broadcaster may agree to transfer the control authority of the IoT devices 400 and 500 using the broadcaster terminal 200. However, the present invention is not limited thereto, and the broadcaster may also agree to transfer the control authority using the IoT devices 400 and 500 themselves. When the IoT devices 400 and 500 of which the broadcaster agrees to transfer the control authority are specific smartphone owned by the broadcaster, the sponsor may search for photos, sound sources, videos, etc. stored inside the smartphone and control such as to make a call to the phone number stored inside the smartphone.

Figure 3:
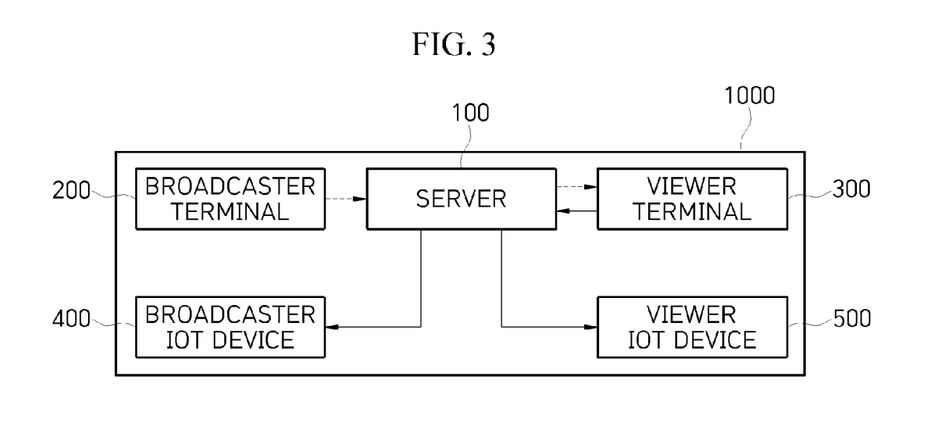
FIG. 3 is a block diagram briefly illustrating the streaming broadcast sponsorship system using an Internet of Things device according to an embodiment of the present invention.

FIG. 3 is a block diagram briefly illustrating the streaming broadcast sponsorship system 1000 using an Internet of Things device according to an embodiment of the present invention.

Meanwhile, the IoT devices 400 and 500 according to the present invention are not limited to the IoT device 400 held by the broadcaster. That is, referring to FIG. 3, the IoT devices 400 and 500 according to the present invention may include a broadcaster IoT device 400 held by the broadcaster and a viewer IoT device 500 held by the viewer.

The broadcaster IoT device 400 according to the present invention is installed and operated at a location adjacent to the broadcaster terminal 200. Preferably, the broadcaster IoT device 400 may be installed to be included in a video frame containing a streaming broadcasting content. It is preferable that the operation of the broadcaster IoT device 400 is included in the content and included together in the video according to the sponsorship of the sponsor and operation information.

The viewer IoT device 500 according to the present invention may be installed and operated at a location adjacent to the viewer terminal 300, but is not limited thereto. It is preferable that the broadcaster IoT device 400 is installed and operated so that the operation thereof is included in the video frame due to the characteristics of a streaming broadcast, but the viewer IoT device 500 need only be installed around the viewer. However, when the viewer IoT device 500 is connected to a separate camera module like the broadcaster IoT device 400, and what the viewer watches is produced as a video and transmitted, and both the broadcaster and the viewer interactively perform streaming together, the viewer IoT device 500 may also be installed so that the operation thereof is included in the video frame.

According to the sponsorship information generated by the sponsor and the control signal generated by the server 100, the broadcaster IoT device 400 and the viewer IoT device 500 may be operated together. For example, in a case that the broadcaster and the viewer hold the same type of IoT devices 400 and 500, which are pre-registered in the server 100, the broadcaster IoT device 400 and the viewer IoT device 500 may be equally controlled. In this case, the viewer IoT device 500 may be IoT devices 400 and 500 held by all viewers except the sponsor.

For example, when a scary story begins to be streamed, or when a play of a horror game is streamed as a content, at a specific point in time, the sponsor may sponsor a predetermined amount of money, and at the same time, turn off the pre-registered light. With the sponsorship of the sponsor, not only the broadcaster's light but also the viewer's light will be turned off, thereby enjoying the horror game together.

Meanwhile, the sponsor may or may not take over the control authority of the viewer IoT device 500 by a rating differentiated by the IoT operation unit 143 according to a predetermined range of donation. For example, the sponsor may be set to be capable of taking over the control authority of the viewer IoT device 500 only when the sponsor obtains a predetermined rating or higher through the sponsorship of more than a predetermined amount.

Alternatively, according to the rating of the broadcaster terminal 200 determined by the channel management unit 120 described above, that is, only when the broadcaster terminal 200 has obtained a predetermined rating or higher, the sponsor may be set to take over the control authority of the viewer IoT device 500. The broadcaster may induce a larger donation from the sponsor and the sponsor may sponsor the broadcaster with a larger donation to enjoy controlling the operations of not only the broadcaster IOT device 400 but also other viewer IoT devices 500 except for the broadcaster and the sponsor.

Meanwhile, the server 100 according to the present invention may further include an IoT matching unit 150 configured to match the broadcaster terminal 200 and the viewer terminal 300 which hold the same IoT devices 400 and 500. As described above, the sponsor may set the operation target device and the operation information of the corresponding operation target device together with the sponsorship. The sponsor may control not only the broadcaster IOT device 400 held by the broadcaster but also the viewer IoT devices 500 held by other viewers, and when controlling the viewer IoT devices 500 held by other viewers, the sponsor may also control the viewer IoT device 500 held by the sponsor.

Therefore, in a case that the broadcaster, the sponsor himself/herself, and other viewers have the same IoT devices 400 and 500 together, they may share more interesting reactions when the IoT devices 400 and 500 are controlled through the sponsorship. The IoT devices 400 and 500 are registered in the IoT control unit 140 and controlled by the IoT control unit 140, as described above. The information of the IoT devices 400 and 500 linked to a user account stored in a user account information unit 160, which will be described later, is stored in the IoT control unit 140. The IoT matching unit 150 may group users having the same IoT devices 400 and 500 using user information stored in the user account information unit 160 and the information of the IoT devices 400 and 500 registered in the IoT control unit 140. The user account information unit 160 includes a broadcaster account information unit 161 and a viewer account information unit 163, which will be described later, and the user account information unit 160 may separate the users having the same IoT devices 400 and 500 into the broadcaster and the viewers and group them and match the broadcaster with the viewers in one-to-many manner. As described above, the IoT devices 400 and 500 include a plurality of different types of IoT devices 400 and 500, and the viewers may be recommended the broadcaster having the same IoT devices 400 and 500 or the viewer terminal may be allowed to access a channel connected to the corresponding broadcaster terminal so that the viewers having the same IoT devices 400 and 500 are capable of accessing the channel of the broadcaster having the same IoT devices 400 and 500.

The server 100 according to the present invention may further include the user account information unit 160. The user account information unit 160 includes the broadcaster account information unit 161 in which the broadcaster's account information is stored and processed, and the viewer account information unit 163 in which the viewer's account information is stored and processed.

The user account information unit 160 according to the present invention may include a broadcaster identification information unit (not illustrated) in which each broadcaster unique identification information for identifying the broadcaster is stored, and a broadcaster sponsorship information unit (not illustrated) in which information such as history of the sponsorship that broadcaster receives is stored. The broadcaster sponsorship information unit may calculate the donation and the number of times of the operation control for the operation information for each IoT device 400 held by the corresponding broadcaster. Therefore, the broadcaster sponsorship information unit may recognize which IoT device 400 is popular among the plurality of IoT devices 400 held by the corresponding broadcaster. In addition, the broadcaster sponsorship information unit may recognize which IoT devices 400 and 500 have a high popularity of the operation control among not only the plurality of IoT devices 400 held by the corresponding broadcaster but also all IoT devices 400 and 500 operated by the server 100 according to the present invention. The broadcaster sponsorship information unit may calculate the IoT devices 400 and 500 which have a high popularity of the operation control, recommend the purchase and registration of the corresponding IoT devices 400 and 500 to broadcasters or viewers who do not hold the corresponding IoT devices 400 and 500, and provide a guide link to the sales page of the corresponding IoT devices 400 and 500. The donation for the sponsor having popular IoT devices 400 and 500 may be higher.

The viewer account information unit 163 according to the present invention may include a viewer identification information unit (not shown) in which each viewer unique identification information for identifying the viewer is stored, and a viewer payment information unit (not shown) in which information such as the sponsorship history that the viewer sponsors is stored. The viewer payment information unit may calculate the sponsorship history of the corresponding viewer. When the cumulative donation of the corresponding viewer within a predetermined period of time is included in a predetermined range, the viewer may be incentivized. The viewer payment Information unit may incentivize a viewer whose cumulative donation is included in a predetermined range as a reward for the cumulative sponsorship by increasing the number of the operation target devices that the viewer can operate when sponsoring or increasing the operation time of the operation target device.

Figure 4:
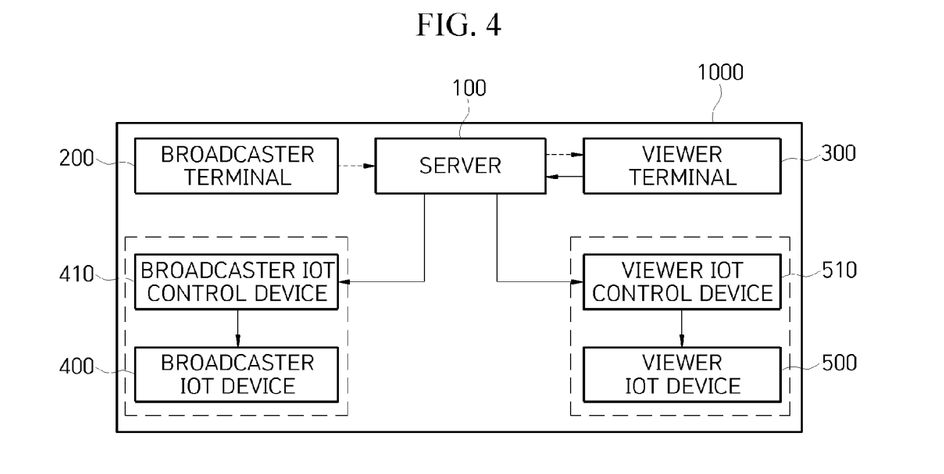
FIG. 4 is a block diagram briefly illustrating the streaming broadcast sponsorship system using an Internet of Things device including an IoT control device according to an embodiment of the present invention.

FIG. 4 is a block diagram briefly illustrating the streaming broadcast sponsorship system using an Internet of Things device including an IoT control device according to an embodiment of the present invention.

The streaming broadcast sponsorship system 1000 using an Internet of Things device according to the present invention may further include IoT control devices 410 and 510. The IoT control devices 410 and 510 according to the present invention are installed at a location adjacent to the IoT devices 400 and 500. Preferably, a broadcaster IoT control device 410 may be installed at a location adjacent to the broadcaster IOT device 400, and a viewer IoT control device 510 may be installed at a location adjacent to the viewer IoT device 500.

The IoT control devices 410 and 510 may receive a control signal transmitted by the server 100 and transmit the received control signal to the IoT devices 400 and 500. Preferably, the broadcaster IoT control device 410 transmits the control signal received from the server 100 to the broadcaster IoT device 400, and the viewer IoT control device 510 transmits the control signal received from the server 100 to the viewer IoT device 500, thereby operating the broadcaster IOT device 400 or the viewer IoT device 500 corresponding to the control signal.

The IoT devices 400 and 500 are mostly operated by wireless communication. It may not be easy to transmit the control signal from the server 100 to the IoT devices 400 and 500 because of problems caused by a distance between the server 100 and the IoT devices 400 and 500, and the like. The IoT control devices 410 and 510 according to the present invention may be wired to the server 100 and wirelessly connected to the IoT devices 400 and 500 installed adjacent to the IoT control devices 410 and 510. Wired and wireless communication may use the publicly-known method. Since the control signal does not have a large amount of data, the IoT devices 400 and 500 may use a low-power wireless network (e.g., Bluetooth, Zigbee, etc.), or a short range communication network such as Wi-Fi.

Of course, the wireless network used by the IoT devices 400 and 500 may be a communication network using LTE, LTE-A, broadband LTE, or broadband LTE-A or 5G network. In a case that the wireless network used by the IoT devices 400 and 500 is the communication network using LTE, LTE-A, broadband LTE, or broadband LTE-A or 5G network, as described above, the IoT devices 400 and 500 may be operated by receiving the control signal not from the IoT control devices 410, 510 but directly from the server 100.

The streaming broadcast sponsorship system 1000 using an Internet of Things device according to the present invention may further include the IoT control device, thereby facilitating the transmission of the control signal and improving the transmission rate and stability thereof.

The control signal according to the present invention may include a time reservation of the IoT devices 400 and 500. That is, when sponsoring the broadcaster, the viewer may select a specific broadcaster IoT device 400, and also set an operation time of the broadcaster IoT device 400 so that the selected broadcaster IoT device 400 is operated at a specific time, not immediately when the selected broadcaster IoT device 400 receives the control signal. Therefore, the viewer may set an operation time of the corresponding broadcaster IoT device 400, such as a wake-up call for the broadcaster or an air conditioner operating at a specific time by sponsoring the broadcaster during broadcasting.

In addition, the IoT devices 400 and 500 according to the embodiment of the present invention may include a feeding device or a play device for a companion animal. The feeding device or play device for a companion animal may be a specific IoT devices 400 and 500, thus the corresponding specific IoT devices 400 and 500 may be operated by the control signal according to the present invention. Therefore, when sponsoring the broadcaster and specifying at least one of the broadcaster IoT devices 400, the viewer may specify the broadcaster IoT device 400 for a companion animal, operate the corresponding broadcaster IoT device 400, or set an operation time of the corresponding broadcaster IoT device 400, that is, set a reservation, such that the viewer may operate the device for a companion animal and watch the live broadcast featuring companion animal, and sponsor the broadcast in real time.

In addition, the streaming broadcast sponsorship system 1000 using an Internet of Things device according to the present invention may control the broadcaster IoT device 400 of the broadcaster even though the broadcaster is not broadcasting, upon approval of the broadcaster.

Figure 5:
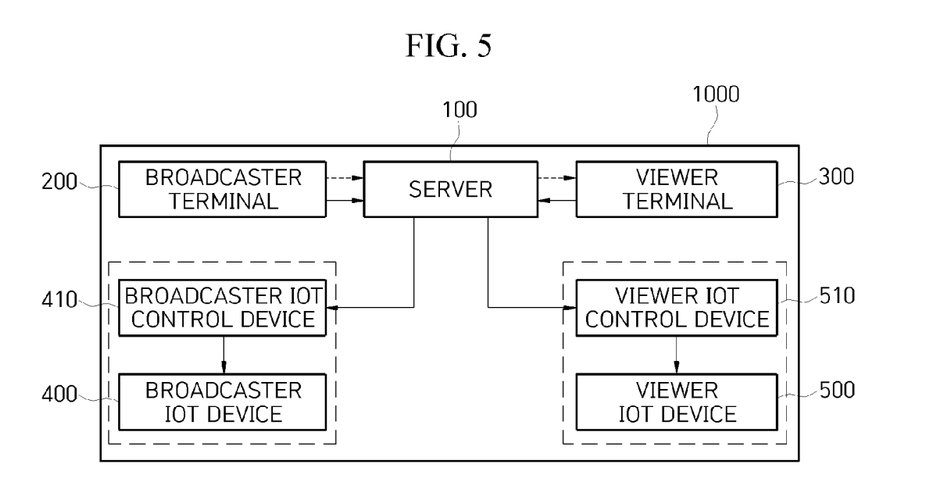
FIG. 5 is a block diagram briefly illustrating the streaming broadcast sponsorship system using an Internet of Things device according to an embodiment of the present invention.

FIG. 5 is a block diagram briefly illustrating the streaming broadcast sponsorship system using an Internet of Things device according to an embodiment of the present invention.

As described above, the viewer terminal 300 generates the sponsorship information for the broadcaster and transmits the sponsorship information to the server 100. The server 100 may receive the sponsorship information from the viewer terminal 300 and transmit a content included in the sponsorship information to the broadcaster terminal 200 or inform the content through a display. Therefore, the broadcaster terminal 200 may recognize that he/she has been sponsored through the viewer terminal 300. The donation may be accumulated and the IoT devices 400 and 500 may be operated according to the sponsorship information transmitted by the viewer terminal 300.

When the broadcaster is sponsored through the viewer terminal 300, the broadcaster terminal 200 may generate a control signal for the operation of the viewer IoT device 500 and transmit the control signal to the server 100. That is, the broadcaster terminal 200 may operate the viewer IoT device 500 as a reaction to the sponsorship. A specific condition may be accompanied when the broadcaster terminal 200 operates the viewer IoT device 500 as the reaction to the sponsorship from the viewer terminal 300. For example, the broadcaster terminal 200 may operate the viewer IoT device 500 held by the corresponding viewer only when the cumulative donation of the viewer terminal 300 is equal to or more than a predetermined amount. Alternatively, the broadcaster terminal 200 may operate the viewer IoT device 500 by using a voucher or a paid item that is provided in the broadcaster terminal 200 and capable of operating the viewer IoT device 500. Alternatively, some of the donation received from the viewer terminal 300 may be deducted and the viewer IoT device 500 may be operated in return.

When the broadcaster terminal 200 generates and transmits the control signal to operate the viewer IoT device 500, the description of the approval for transferring the operation authority of the viewer IoT device 500 may be the same as described above.

Among the drawings attached herein, in FIG. 1 and FIGS. 3 to 5, the dotted arrows are for illustrating a transmission direction of the content as an example, and the solid arrows are for illustrating a transmission direction of the sponsorship information or the control signal for the operation of the IoT devices 400 and 500.

In the present specification, the streaming video processing unit 110, the channel management unit 120, the IoT control unit 140, the sponsorship information processing unit 130, the IoT matching unit 150, or the user account information unit 160 may be processors that execute sequential processes stored in memory. Alternatively, they may operate as software modules driven and controlled by a processor. Furthermore, the processor may be a hardware device.

In the present specification, the broadcaster terminal 200 or the viewer terminal 300 may include at least one of all types of wireless communication devices, such as a desktop personal computer, a laptop personal computer, a netbook computer, a smartphone, a smartpad, a tablet personal computer, a mobile phone, a video phone, a personal communication system (PCS), a global system for mobile communication (GSM), a personal digital cellular (PDC), a personal handyphone System (PHS), a personal digital assistant (PDA), an international mobile telecommunication (IMT)-2000, a code division multiple Access (CDMA)-2000, a W-code division multiple access (W-CDMA), a wireless broadband Internet (Wibro) terminal, a portable multimedia player (PMP), a wearable device (e.g., smart glasses, a head-mounted-device (HMD), or a smart watch, and wired communication devices such as a desktop computer and a smart TV, and may further include a camera module for shooting.

In the present specification, the term 'unit' includes a unit realized by hardware, a unit realized by software, and a unit realized by using both software and hardware. In addition, one unit may be realized by using two or more hardware, and two or more units may be realized by using one hardware.

The protective scope of the present invention is not limited to the description and expression of the embodiments explicitly described above. In addition, it is reiterated that the scope of protection of the present invention should not be limited by the substitutions or modifications which are obvious in the art.

The invention claimed is:

1. A streaming broadcast sponsorship system using the Internet of Things device, the streaming broadcast sponsorship system comprising: a broadcaster terminal configured to generate a content and perform a streaming broadcast;
   a viewer terminal configured to be capable of viewing the broadcast;
   a server configured to receive the content from the broadcaster terminal, and transmit the received content to the viewer terminal; and IoT devices configured to be capable of communicating with the server and operated by the server, wherein the viewer terminal generates sponsorship information for the broadcaster and transmit the sponsorship information to the server, and the server transmits a control signal corresponding to the sponsorship information to the IoT devices, and the IoT devices are operated by the control signal, and the sponsorship information comprises at least one of a donation, an operation target device, and operation information of the operation target device, and the broadcaster terminal and the viewer terminal are rated differentially according to the donation, and the server further comprises a channel management unit configured to manage channels; and an IoT operation unit configured to generate the control signal, wherein the channel management unit limits the number of available accesses of the viewer terminal that is capable of accessing the channel according to the rating of the broadcaster terminal, the IoT operation unit differentiates operation times of the IoT devices according to the rating of the viewer terminal, and the server further comprises a broadcaster sponsorship information unit configured to calculate the donation and the number of times of operation control of the IoT devices for the operation information of the IoT devices, and wherein the broadcaster sponsorship information unit calculates the IoT devices which have a high popularity of the operation control, and recommends purchasing and registering the calculated IoT devices to the broadcaster terminal.

2. The streaming broadcast sponsorship system of claim 1, wherein the IoT devices are pre-registered in the server and only for the devices which agree to set an operation authority before broadcasting are operated by the control signal.

3. The streaming broadcast sponsorship system of claim 1, wherein the IoT devices comprise:
 a broadcaster IoT device installed and operated at a location adjacent to the broadcaster terminal; and
 a viewer IoT device installed and operated at a location adjacent to the viewer terminal.

4. The streaming broadcast sponsorship system of claim 3, wherein the server further comprises an IoT matching unit configured to match the broadcaster terminal and the viewer terminal which have the same IoT device.

* * * * *